Jan. 6, 1925.
J. R. McMAHON
1,522,310
DIRECTION SIGNAL
Filed Feb. 19, 1924
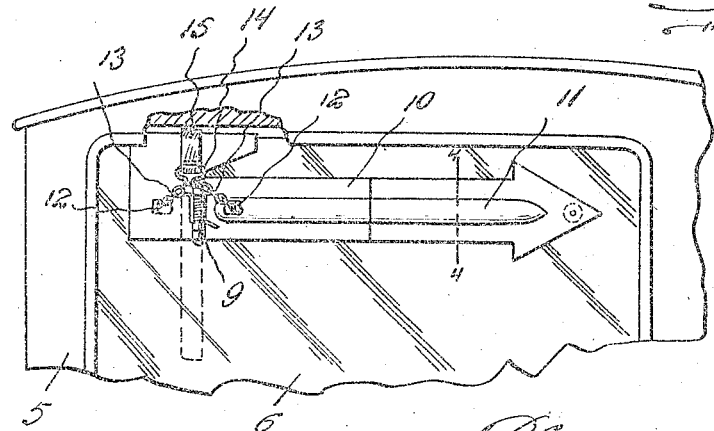
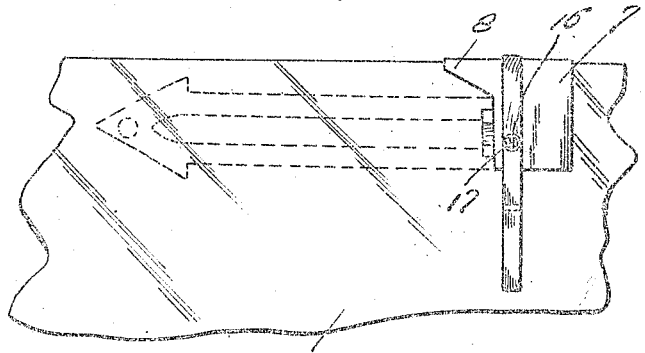
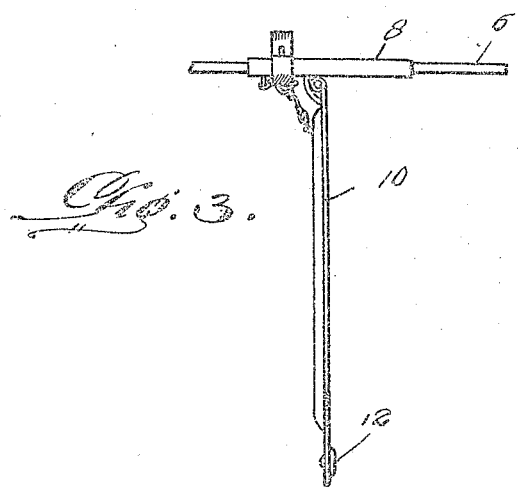
J. R. McMahon,
Inventor
By *Clarence W. Kline*
Attorney Patented Jan. 6, 1925.

1,522,310

UNITED STATES PATENT OFFICE.

JOHN R. McMAHON, OF DES MOINES, IOWA.

DIRECTION SIGNAL.

Application filed February 19, 1924. Serial No. 693,809.

*To all whom it may concern:*

Be it known that I, JOHN R. MCMAHON, a citizen of the United States, residing at Des Moines, in the county of Polk and State of Iowa, have invented certain new and useful Improvements in Direction Signals, of which the following is a specification.

This invention relates to certain new and useful improvements in direction signals for motor vehicles and has particular reference to the provision of a device of that kind, particularly useful upon closed cars.

The primary object of the invention is to provide a direction signal for use upon motor vehicles known as coupés and sedans and by means of which the driver may readily indicate his intention to turn when the glass panel in the adjacent side of the vehicle body is closed.

Another object of the invention is to provide a signal of this kind and type which embraces the desired qualities of simplicity, durability and efficiency in operation so that the device may meet with all of the requirements for a successful commercial use.

A further object is to provide a direction signal which is a substantial improvement over the direction signal shown and described in my application, Serial No. 666,-529, allowed on or about January 30th, 1924.

With the foregoing and other objects in view as the nature of the invention will be better understood, the same consists in the novel form, combination and arrangement of parts hereinafter more fully described, shown in the accompanying drawing and claimed.

In the drawing, wherein like reference characters indicate corresponding parts throughout several views, Figure 1 is a fragmentary side elevational view illustrating a direction signal constructed in accordance with the present invention, operatively applied to the glass panel of a closed car body with the indicating pointer in its normal inoperative position, Figure 2 is a fragmentary inside elevational view of the glass panel of the sedan or coupé door to which the present direction signal is applied for disclosing more accurately the means whereby said indicating pointer may be moved to an operative position, Figure 3 is a top plan view of the present direction signal applied, the pointer being shown as extended outwardly to an operative indicating position, and Figure 4 is a detail vertical sectional view taken substantially upon the line 4—4 of Figure 1 for more clearly disclosing the specific construction of the pointer per se.

Referring more in detail to the drawing, 5 indicates the body of the so-called closed car automobile, the doors of which are provided with vertically movable glass panels 6 which may be lowered for opening the same, as is well known in the art, the panel herein shown being that adjacent the driver's seat.

In accordance with the present invention, a signal is provided including a mounting member 7 of substantially inverted U-shaped form adapted to be slipped onto the upper edge portion of the panel 6 and preferably constructed of a springy sheet metal material whereby said mounting member in reality serves as a spring clip for engaging over the upper edge of said glass panel 6. For preventing this spring clasp 7 from tilting upon the panel 6 due to the weight of the pointer hingedly secured thereto and to be hereinafter more fully described, the upper closed side of said clip is provided with an extension 8 as more clearly shown in the side elevational views, Figures 1 and 2.

Hingedly secured to the outer side portion of said spring clip or clasp 7 and at the rear edge thereof in order to swing into a horizontal plane, said hinge connection being designated 9, is a signalling member or arm 10 in the general form of an arrow as shown. The connection 9 between the pointer 10 and said clip 7 is in the form of a spring hinge that normally serves as a means for maintaining this pointer or signal arm in the position shown in Figures 1 and 2, that is, at a point adjacent the glass panel 6.

For strengthening purposes it is preferable that this signal member or pointer 10 which is of sheet metal, be formed throughout almost its entire length with a longitudinal corrugation 11 and for preventing direct contact between this pointer and the glass panel 6 the end thereof carries a rubber tip 12.

At adjacent points the outer side of the spring clip 7 as well as the pointer 10 are formed with struck-out lugs 12—12 to which are connected the lower ends of chain sections 13—13. These chain sections are connected to a ring 14 that is carried by one end of an operating strap 15 that extends upwardly, passes over the clip 7 and then downwardly into the body of the machine at a point adjacent the driver's seat thereof, and it will be at once obvious that by pulling upon this strap 15 the signal member or pointer 10 will be moved to the outwardly swung position shown in Figure 3 for thus indicating to drivers of approaching vehicles or to traffic officers that the driver of this particular vehicle intends to make a turn.

The operating strap 15 is formed at a predetermined point with a reinforced opening 16 that is adapted to be passed over a struck-out lug 17 upon the inner side of the clip 7 for maintaining the signal arm or pointer 10 in the operative position shown in Figure 3.

From the foregoing description it is believed that the construction and operation as well as the advantages of the invention will be readily understood and appreciated by those skilled in the art.

Minor changes may be made without departing from the spirit and scope of the invention as claimed.

What I claim as new is:—

1. An indicator for automobiles comprising a substantially U-shaped resilient metal clip, an indicator arm pivotally connected at its inner end to said clip, spring means active on said arm for normally maintaining the same in inoperative position, an operating member slidably mounted upon said clip, cooperating means between the clip and operating member for holding the latter in a set position, a flexible element anchored at one end upon the clip and connected at its opposite end to the adjacent end of the indicator arm, and a connection between the intermediate portion of said flexible element and said operating member.

2. An indicator for automobiles comprising a substantially U-shaped resilient metal clip, an indicator arm pivotally connected at its inner end to said clip, spring means active on said arm for normally maintaining the same in inoperative position, a substantially U-shaped operating slot slidably mounted upon said clip, the inner strap being provided with an opening, said clip being provided with a lug for reception in said opening for locking the strap in a set position, a flexible element anchored at one end upon said clip and connected at its opposite end to the inner end of said indicator arm, the adjacent arm of said strap being connected to the intermediate portion of said flexible element, so that when the strap is slid back and forth on the clip, it will serve to swing said arm upon its pivot.

In testimony whereof I affix my signature.

JOHN R. McMAHON.